(12) United States Patent
Yakymyshyn et al.

(10) Patent No.: US 7,251,265 B2
(45) Date of Patent: Jul. 31, 2007

(54) MICRO-CAVITY LASER HAVING INCREASED SENSITIVITY

(75) Inventors: Christopher P. Yakymyshyn, Seminole, FL (US); William Q. Law, Beaverton, OR (US); William A. Hagerup, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 316 days.

(21) Appl. No.: 11/077,710

(22) Filed: Mar. 10, 2005

(65) Prior Publication Data
US 2005/0201425 A1 Sep. 15, 2005

Related U.S. Application Data

(60) Provisional application No. 60/552,334, filed on Mar. 10, 2004.

(51) Int. Cl.
*H01S 3/08* (2006.01)
(52) U.S. Cl. .................. 372/108; 257/86; 385/129
(58) Field of Classification Search ............... 372/108, 372/21, 25, 46.01; 359/315
See application file for complete search history.

(56) References Cited

U.S. PATENT DOCUMENTS

| 3,892,469 | A | 7/1975 | Lotspeich |
| 4,755,415 | A | 7/1988 | Iijima et al. |
| 4,982,405 | A | 1/1991 | Zayhowski |
| 5,071,232 | A | 12/1991 | Kato et al. |
| 5,074,631 | A | 12/1991 | Hamano et al. |
| 5,263,102 | A | 11/1993 | Hakogi |
| 5,381,431 | A * | 1/1995 | Zayhowski ............... 372/25 |
| 5,754,333 | A | 5/1998 | Fulbert |
| 5,889,798 | A | 3/1999 | Molva |
| 6,023,479 | A * | 2/2000 | Thony et al. .............. 372/11 |
| 6,035,089 | A * | 3/2000 | Grann et al. ............. 385/129 |
| 6,044,190 | A | 3/2000 | Kashyap |
| 6,246,815 | B1 | 6/2001 | Fujiwara et al. |
| 6,804,283 | B2 * | 10/2004 | Scherer ................. 372/50.21 |

OTHER PUBLICATIONS

Y. Li et al., "Rapidly tunable millimeter-wave Optical transmitter for Lidar-Radar", Center for Microwave-Lightwave Engineering, Drexel University, Philadelphia, PA, pp. 1-23.
A.J.C. Vieira et al., "Nd:LiNbO3 Microchip Laser with 20 GHz Subcarrier," 1997 IEEE MTT-S Digest, pp. 229-232.

* cited by examiner

*Primary Examiner*—Minsun Oh Harvey
*Assistant Examiner*—Tuan N. Nguyen
(74) *Attorney, Agent, or Firm*—William K. Bucher

(57) ABSTRACT

An optically pumped micro-cavity laser has an optical gain cavity and an optical resonant cavity. The optical gain cavity has a gain medium disposed that generates an optical output in response to an optical pump signal. The optical resonant cavity has an electro-optic material in which is disposed an electrode structure with first and second apertures disposed generally parallel to an optical signal propagating within the electro-optic material. Electrically conductive material is disposed within the apertures coupling an electrical signal to the optical cavity. Optically reflective material is disposed on the opposing surfaces of the micro-cavity laser and between the optical gain cavity and the optical resonant cavity.

7 Claims, 10 Drawing Sheets

MICRO-CAVITY LASER HAVING INCREASED SENSITIVITY

CROSS-REFERENCE TO RELATED APPLICATION

This application claims the benefit of the U.S. Provisional Application No. 60/552,334, filed Mar. 10, 2004.

BACKGROUND OF THE INVENTION

The present invention relates generally to optical cavities and more particularly to a micro-cavity laser having increased sensitivity to applied electrical fields.

U.S. Pat. No. 4,982,405 teaches a Q-switched micro-cavity laser having a first resonant cavity consisting of a gain medium disposed between two optically reflective mirrors. A second optical resonant cavity is formed by two partially reflective mirrors and is physically and optically coupled to the first resonant cavity. The first resonant cavity will lase when pumped by an external optical source. The reflectivity of the intermediate mirror common to the first and second cavities as seen by the gain medium of the first resonant cavity looking toward the second resonant cavity is determined by the resonant modes of the second resonant cavity. It is therefore possible to prevent or permit the gain medium to lase by adjusting the second resonant cavity such that the resonances of the second cavity causes either low reflectivity of the common mirror, which prevents lasing, or high reflectivity in the common mirror, which induces lasing.

The '405 patent teaches a number of embodiments for varying the second resonant cavity. Of particular interest to the present invention, the second resonant cavity of formed of an electro-optic material disposed between the two partially reflective mirrors with two opposing electrodes disposed adjacent to the electro-optic material. Applying an electric field across the electro-optic material changes the index of refraction of the material, which varies the reflectivity of the intermediate mirror as seem by the gain medium in the gain cavity. This results in the micro-cavity laser generating a train of optical pulses that are dependent on the applied electrical field across the electro-optic material. The '405 patent also teaches that the second resonant cavity need not affect the gain cavity so much that the lasing is turned on or off. Instead, the resonant cavity can be used to modulate the intensity of the light produced by the gain medium.

A paper titled "Rapidly Tunable Millimeter-Wave Optical Transmitter for Lidar-Radar" by Y. Li, A. J. C. Vieira, S. M. Goldwasser and P. R. Herczfeld teaches the use of two electro-optical mono-mode micro-chip laser sections formed on a single composite crystal for producing a rapidly tunable millimeter wave optical transmitter. The side-by-side micro-chip lasers are formed with a $Nd:YVO_4$ gain medium resonant cavity and a $MgO:LiNbO_3$ electro-optic resonant cavity. The micro-chip lasers are optically pumped by independent 808 nm high power laser diodes. Electrodes are deposited on opposing sides of each of the electro-optic resonant cavities. A DC voltage is applied to one of the electrodes of one of the electro-optic resonant cavities, which changes the wavelength of the optical output with respect to the other micro-chip laser. The optical output of the micro-chip lasers are heterodyned resulting a tunable beat frequency range of 45 GHz with a voltage sensitivity of 10.6 MHz/V. The transmitter was set at an 8 GHZ bias point using a phase lock loop. A 10 MHZ, 18V peak-to-peak ramp signal is applied to one of the micro-chip lasers. The signal was recovered and measured, which showed a frequency excursion of 190.8 MHz over a 50 ns time corresponding to a chirp rate of 3816 THz/sec. The reference concludes by indicating continuing efforts to increase the voltage sensitivity by reducing the crystal thickness and improving the electrical contacts.

The strength of the electric field distribution within the electro-optic material is a function of the distance between the opposing electrodes and the amplitude of the applied electrical signal. The strength of the electric field is the inverse of the distance separation of the electrodes. As the distance between the electrodes decreases, the strength of the electric field between them increases. As the distance decreases, the magnitude of the electrical signal can decrease to generate the same amount of change in the index of refraction.

Currently, the minimum overall dimensions of the electro-optic material used in optical devices and cavities is limited by the practical size at which the material can be handled resulting in electrodes that are positioned at a substantial distance from the optical path of the optical signal. This results in optical devices having low sensitivity to the applied electrical signal.

What is needed is an electrically controlled micro-cavity laser having improved sensitivity to applied electrical signals.

SUMMARY OF THE INVENTION

Accordingly, the present invention is an optically pumped micro-cavity laser having an optical gain cavity and an optical resonant cavity. The optical gain cavity has an optical gain medium disposed between opposing optically reflective materials receiving an optical pump signal and generating an optical output. The optical resonant cavity has electro-optic material disposed between opposing optically reflective materials with one of the optically reflective materials being a common reflective material with one of the optical reflective materials of the optical gain cavity. The optical resonant cavity receives the optical output from the optical gain cavity. A conductive electrode structure having first and second apertures is formed in the electro-optic material generally orthogonal to the optically reflective materials and generally parallel to the received optical output from the optical gain cavity propagating within the electro-optic material. Electrically conductive material is disposed within the first and second apertures. The first and second apertures are preferably disposed adjacent to the received optical output generated by the optical gain cavity and propagating within the electro-optic material.

Electrically conductive contacts maybe formed on at least one exterior surface of the optical resonant cavity with one of the electrically conductive contacts being electrically coupled to the electrically conductive material disposed in the first aperture and the other electrically conductive contact electrically being coupled to the electrically conductive material disposed in the second aperture. The electrically conductive contacts may also be formed on a separate exterior surface of the optical resonant cavity. A resistor maybe coupled between the electrically conductive materials disposed within the first and second apertures or between the electrically conductive contacts.

The objects, advantages and novel features of the present invention are apparent from the following detailed description when read in conjunction with appended claims and attached drawings.

DETAILED DESCRIPTION OF THE PREFERRED EMBODIMENT

Figure 1A:
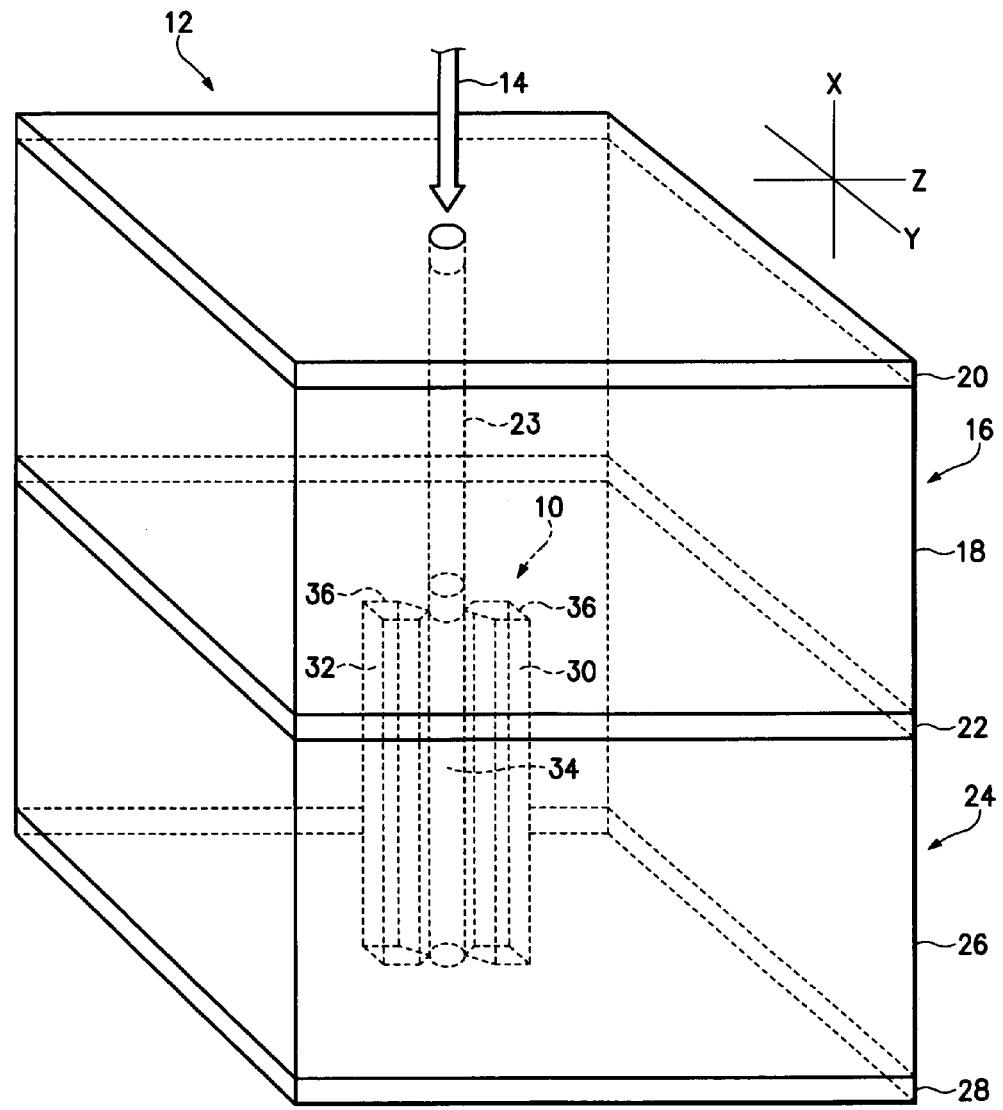
FIGS. 1A-1C illustrate alternative electrode configurations of the electrode structure for micro-cavity laser according to the present invention.
Figure 1B:
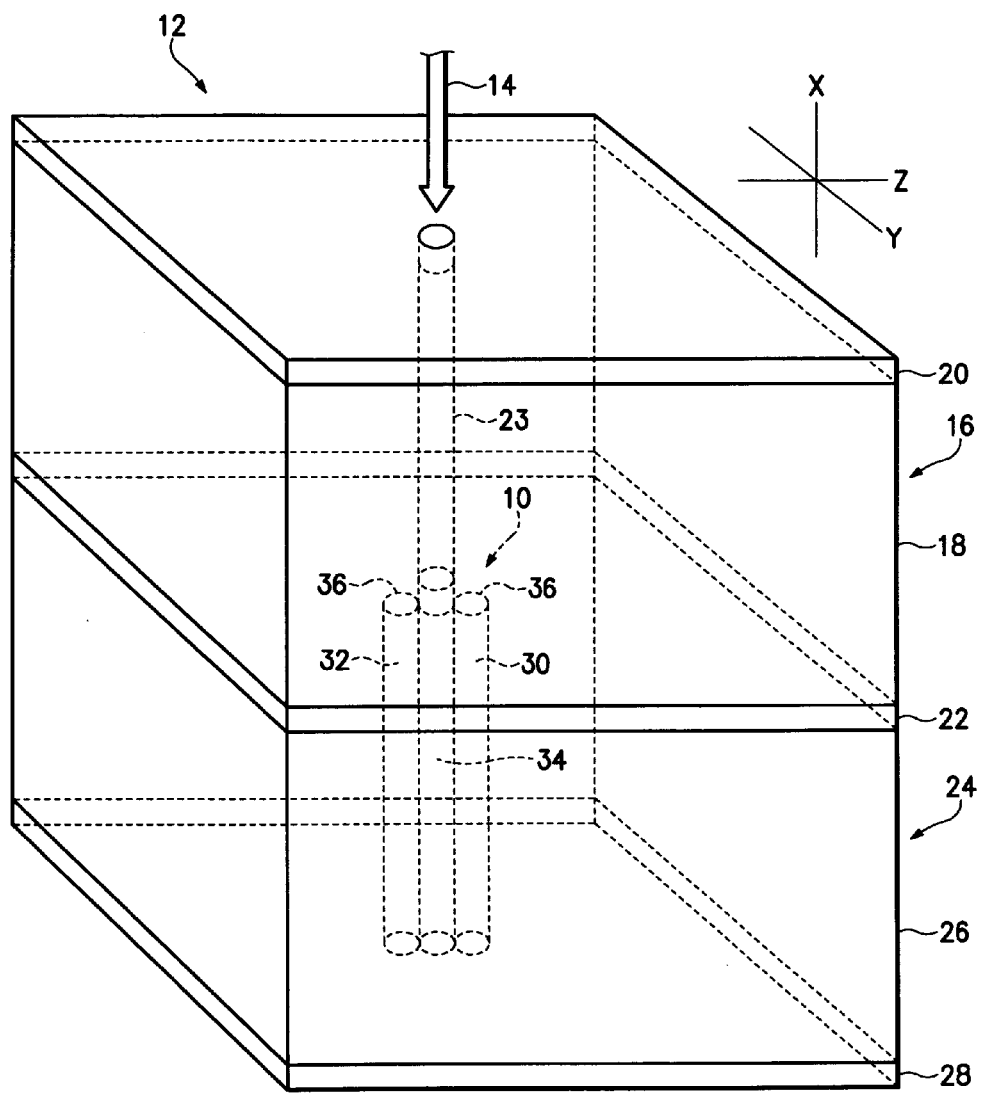
Figure 1C:
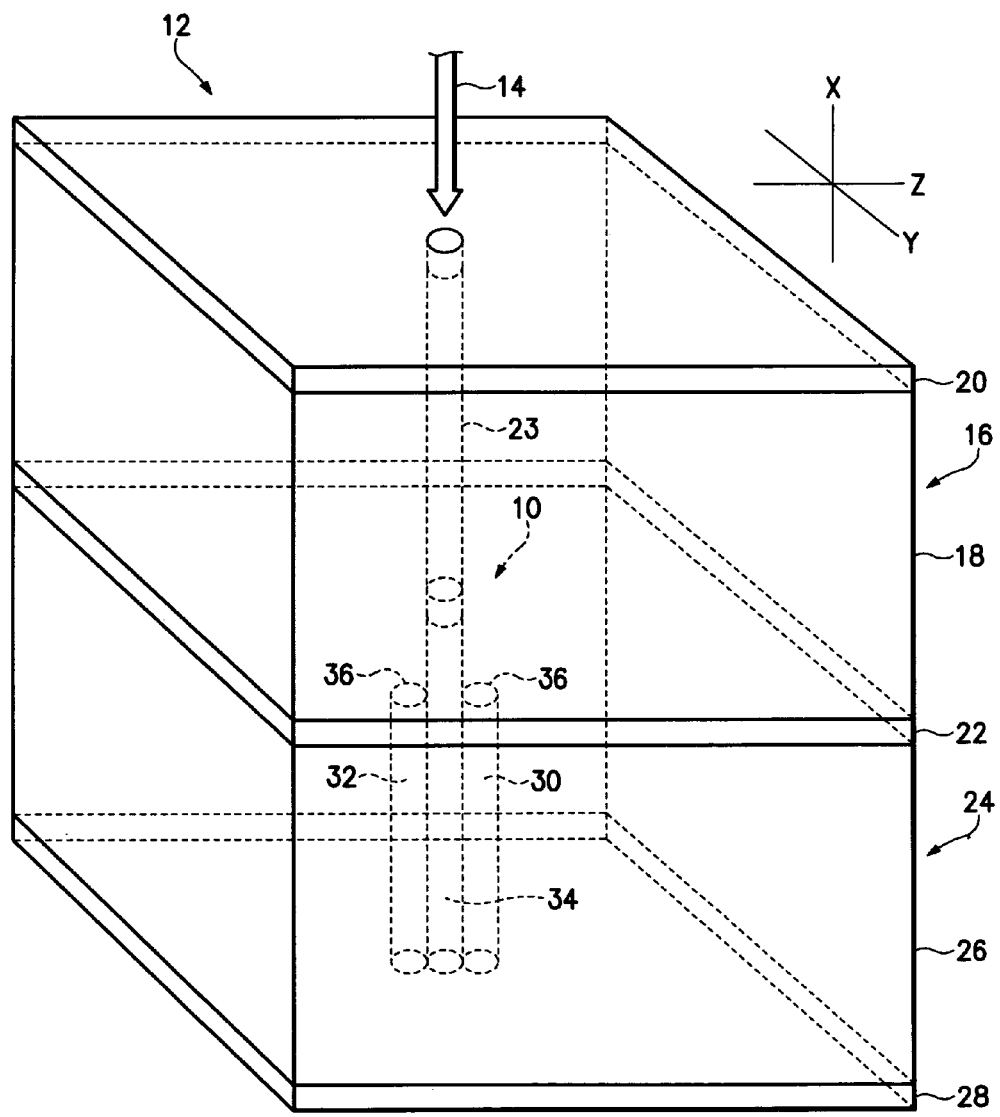

Referring to FIGS. 1A, 1B and 1C, there are shown various electrodes structures 10 usable in a micro-cavity laser 12 receiving an optical signal 14. The micro-cavity laser 12 has a gain cavity 16 having an active gain medium 18 disposed between two optically reflective materials 20 and 22. The active gain medium 18 generates a coherent, polarized optical output 23 when pumped by an coherent optical input, such as the optical signal 14. An optical resonant cavity 24 is coupled to the gain cavity 16 and has an electro-optic material 26 disposed between opposing optical reflective materials 22 and 28 where the optically reflective material 22 is common to the two cavities. The optically reflective materials 20, 22 and 28 are preferably ceramic mirrors formed from layers of zirconium dioxide, silicon dioxide and silicon nitride. It is important in certain applications that the optically reflective materials be non-metallic to reduce capacitive and inductive effects. The reflectivity of the optically reflective materials 20, 22 and 28 vary depending on the proposed application for the micro-cavity laser 12. The optically reflective materials 20, 22 and 28 may be partially reflective or totally reflective to particular wavelengths of light. For example, optically reflective material 20 may have low reflectivity for the pump laser light (e.g. 5% reflectivity) of the optical signal 14 and high reflectivity (e.g. 99.5% reflectivity) for the laser light 23 generated by the gain medium 18. The optical reflective material 22 may have high reflectivity for the pump laser light (e.g. greater than 90% reflectivity) and medium reflectivity for the gain medium laser light 23 (e.g 50% reflectivity). The optically reflective material 28 generally has a high reflectivity (e.g. 95 to 99.5% reflectivity) depending on the output direction of the laser light 23 from the micro-cavity laser 12. The reflectivity of the optical reflective medium 28 is a high as possible for generating an output along the same path as the pump laser light. The reflectivity of the optically reflective material 28 is as high as 99.5% for generating an output opposite that of the pump laser light. The gain medium 18 will produce laser light of a frequency determined by the modes of the cavity. Applying an electromagnetic field across the electro-optic material 26 changes the index of refraction of the material, causing the reflectivity of the optically reflective material 22 to vary as seen by the gain medium 18 in the gain cavity 16. The application of the varying electromagnetic field results in the production of a series of output pulses or frequency modulation of the laser light 23 of the gain medium 18 as the reflectivity of the common optically reflective material 22 seen by the gain medium 18 changes due to resonances in the optical resonant cavity 24.

The electro-optical material 26 in the optical resonant cavity 24 may be formed from inorganic and organic materials, such as Rubidium Titanyl Arsenate (RTA), Rubidium Titanyl Phosphate (RTP), Zinc Telluride (ZnTe), Dimethy-1Amino-methyl Stilbazolium Tosylate (DAST), Potassium Titanyl Phosphate (KTP), or other electro-optic materials, such as electro-optic polymers, all having the property of a changing index of refraction in response to an applied electromagnetic field. The inorganic and organic materials have crystallographic axes defining the crystallographic structure of the electro-optic material 26. Crystals systems are cubic, tetragonal, orthorhombic, monoclinic and triclinic. The crystallographic axes for the cubic, tetragonal and the orthorhombic systems are mutually perpendicular to each other. The monoclinic and triclinic crystal systems have one or more of the crystallographic axes at oblique angles to each other. The hexagonal crystal system has two crystallographic axes falling on the same plane at 120° to each other and a third axis orthogonal to the other two. The inorganic and organic materials further have X, Y and Z optical axes which may or may not coincide with the crystallographic axes.

The optical resonant cavity 24 will be described below in relation to inorganic RTA electro-optic material having an orthorhombic crystalline structure and optical axes coincident with the crystallographic axes. It is understood that the optical resonant cavity 24 is applicable to the other crystal structures and organic polymers having one or more optical axes that are responsive to an electromagnetic field for changing the index of refraction of the electro-optic material. Further, the present invention will be described in relation to specific optical axes of the RTA electro-optic material 26 and a specific orientation of a propagating laser light 23 and orientations of the electromagnetic field within the RTA electro-optic material 26. In the preferred embodiment, the RTA electro-optic material 26 is an X-cut crystal face where the cleaved and polished surfaces of the crystal are perpendicular to the optical X-axis. Alternatively, the RTA electro-optic material 26 may be a Y-cut crystal face. The X-cut crystal is preferred over the Y-cut crystal for minimizing distortions from the acoustic modes generated within the electro-optic material 26. It should be noted that the electro-optic properties of other crystallographic structures may result in the preferred cut crystal face being orthogonal to the optical Z-axis producing a Z-cut crystal face. The gain cavity will be described in relation to Nd:YVO$_4$ gain medium 18. It is understood that other gain mediums may be used without departing from the scope of the present invention.

The optical signal 14 provided to the micro-cavity laser 12 is preferably provided by a coherent optical source, such as a laser diode or the like. An example of an optical signal 14 focused on an gain cavity 16 is a 808 nm optical signal having an optical path diameter ranging from approximately 15 to 150 microns. Other optical path diameters may be used with the electrode structure of the present invention.

The change in the index of refraction of the electro-optic material 26 in the presence of an electromagnetic field is a function of the orientation of the laser light 23 propagating in the electro-optic material 26 and the relationship of the polarization state of the laser light 23 and the electrode structures 10 to the optical axes of the electro-optic material 26. For example, RTA electro-optic material exhibits the highest index of refraction and largest sensitivity response to an electromagnetic signal when the polarization state of the laser light 23 and the electromagnetic field are parallel with the optical Z-axis of the RTA material. However, the RTA electro-optic material exhibits the highest piezoelectric response along the Z-axis, and the lowest piezoelectric response along the X-axis, when the electromagnetic field is parallel to the optical Z-axis. The piezoelectric effect causes a change in the refractive index of the crystal, but also physically alters the length of the material (or strain) along the three principle crystal axes. To minimize the effect of the piezoelectric strain on the modulated signal, it is desirable to ensure that the smallest change in crystal length occurs along the crystal axis that is perpendicular to the two cavity mirrors attached to the crystal. Therefore, in the preferred embodiment, the polarization state of the laser light 23 and the electromagnetic field are parallel with the optical Z-axis, and the optical beam propagates through the crystal parallel to the X-axis to minimize the effects of the acoustic modes in the RTA electro-optic material on the resulting optical modulation.

The electrode structures 10 in FIGS. 1A, 1B and 1C have a pair of apertures 30 and 32 formed in the optically reflective material 28 and the RTA electro-optic material 26 that are generally parallel to the optical path 34 of the laser light 23 from the gain medium 18 propagating through the electro-optic material 26. The RTA electro-optic material 26 has mutually perpendicular optical axes X, Y and Z that coincide with the crystallographic axes of the RTA material. The apertures 30 and 32 are disposed on the opposite sides of the optical path 34 of the propagating laser light 23 and are oriented parallel to the optical X-axis of the electro-optic material 26. The apertures 30 and 32 are preferably formed as close as possible to the propagating laser light 23 with the aperture separation, for example, being in the range of 45 to 120 microns. In some applications, the apertures 30 and 32 may extend into the optical path 34 of the propagating laser signal. The apertures 30 and 32 in FIG. 1A have a polygonal sectional shape with an apex directed toward the optical path 34 of the propagating laser signal 23. The apexes of the polygonal shapes concentrates the electro-magnetic field across the optical path 34. The polygonal electrode structure does not lend itself to usual manufacturing processes whereas a circular electrode structure as illustrated in FIG. 1B is easily produced. The circular apertures 30 and 32 in FIG. 1B have the same orientation with the optical path as in FIG. 1A. The circular apertures 30 and 32 are produced using an excimer pulsed laser that can produce apertures of approximately 100 microns in diameter and of varying depth in the electro-optic material 26. The circular apertures 30 and 32 in FIG. 1C are shown extending part way through the electro-optic material 26 and have the same orientation with the optical path in FIG. 1B. The blind hole apertures reduce the risk of damage to the optically reflective material 22 when the pulsed laser light from the excimer laser reaches the opposite end of the optical resonant cavity 24. The aperture configurations of FIGS. 1A-1C are but three examples and other aperture configurations are possible without departing from the scope of the invention.

Electrically conductive material 36 is disposed within each of the apertures 30 and 32. The electrically conductive material 36 may take the form of conductive wires shaped to conform to the apertures 30 and 32, conductive material deposited on the inner surfaces of the apertures, conductive epoxy filling the apertures, or the like. The deposited conductive material is preferably gold plated over a layer of chromium. The electrically conductive material 36 preferably extends to the exterior surface of the optically reflective material 28 to allow the electrode structure 10 to be electrically coupled to an electromagnetic source, such as a voltage source. Alternately, the electrically conductive material 26 may be connecting terminals for the voltage source where the ends of the terminals are inserted into the apertures 30 and 32. In a further alternative, the electrically conductive material 36 may reside totally within the electro-optic material 26 and the connecting terminals are inserted into the apertures 30 and 32 to make contact with the electrically conductive material 36. Forming the electrode structure 10 within the optical resonant cavity 24 decreases the distance between the electrodes thus increasing the strength of the electric field applied across optical path 34 of the propagating laser signal. This increases the sensitivity of the electro-optic material 26 to the applied electric field.

In a specific embodiment where the electrically conductive material 36 is an electrically conductive epoxy, the apertures 30 and 32 extend through the optical resonant cavity 24 and the electrically conductive epoxy fills the apertures 30 and 32. Filter paper is positioned on one side of the optical resonant cavity 24 covering the apertures 30 and 32. A vacuum is applied to this side of the optical resonant cavity 24 and the electrically conductive epoxy is applied to the apertures 30 and 32 on the other side of the optical resonant cavity 26. The vacuum causes the electrically conductive epoxy to be drawn into the apertures 30 and 32. The filter paper prevents the electrically conductive epoxy from being drawn out of the apertures 30 and 32.

Figure 2A:
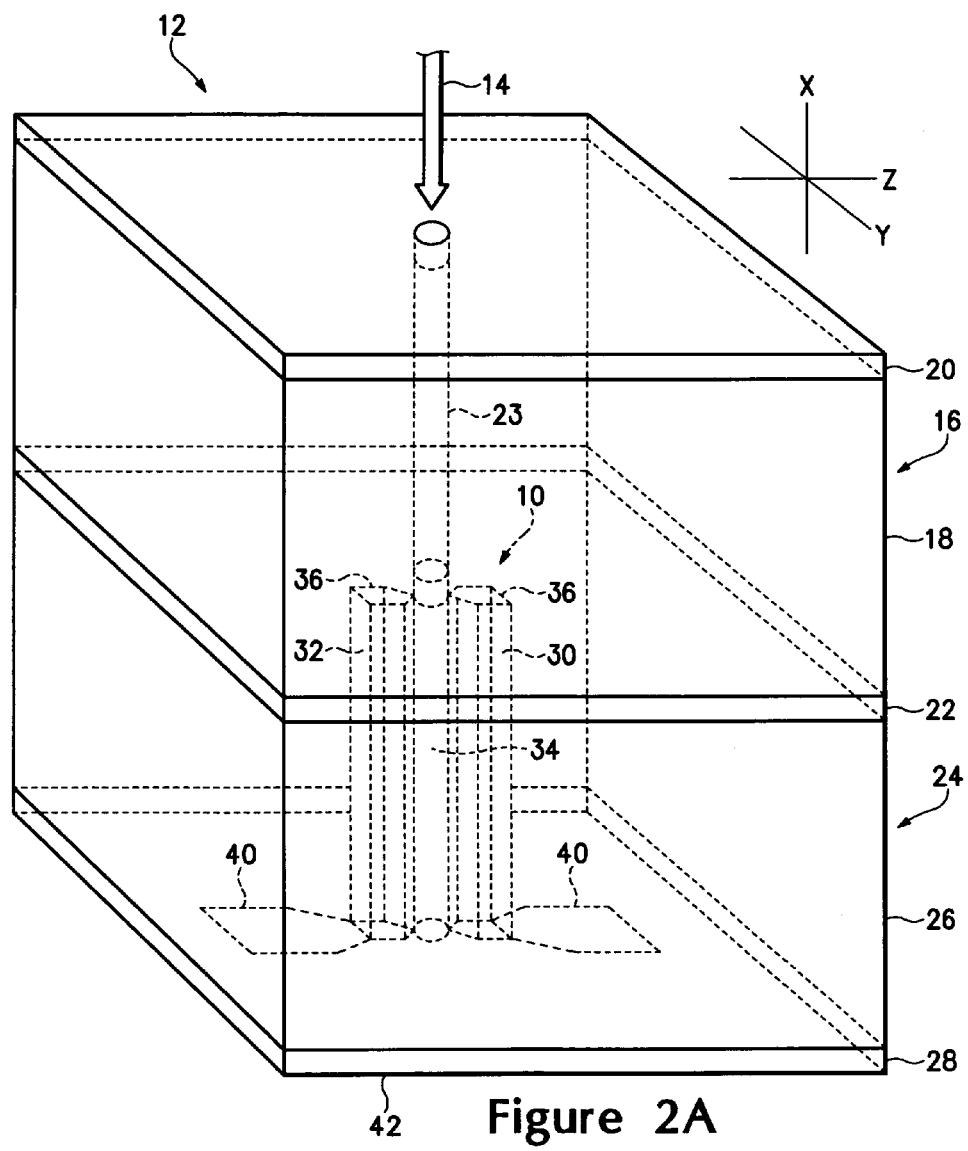
FIGS. 2A-2E illustrate alternative contact configurations for the electrode structure in the micro-cavity laser according to the present invention.
Figure 2B:
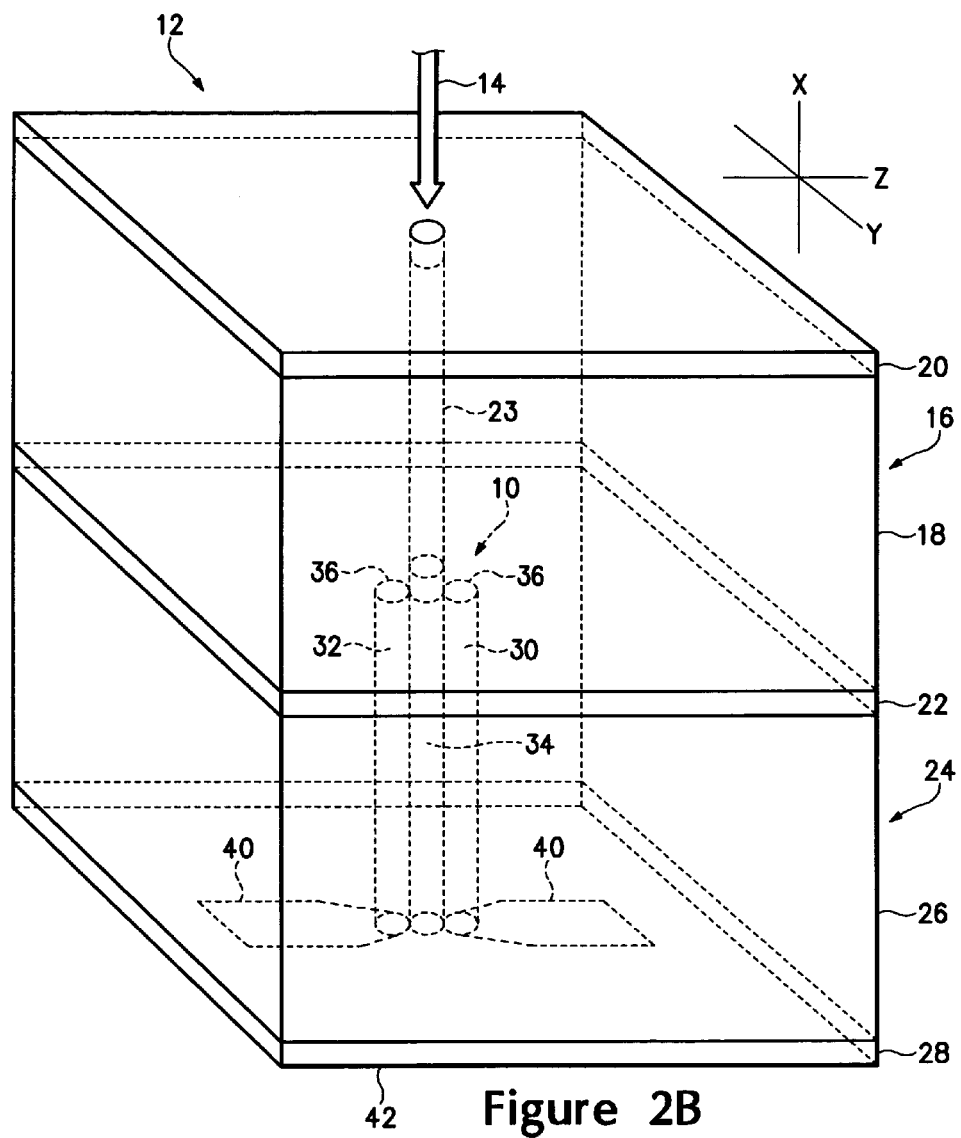
Figure 2C:
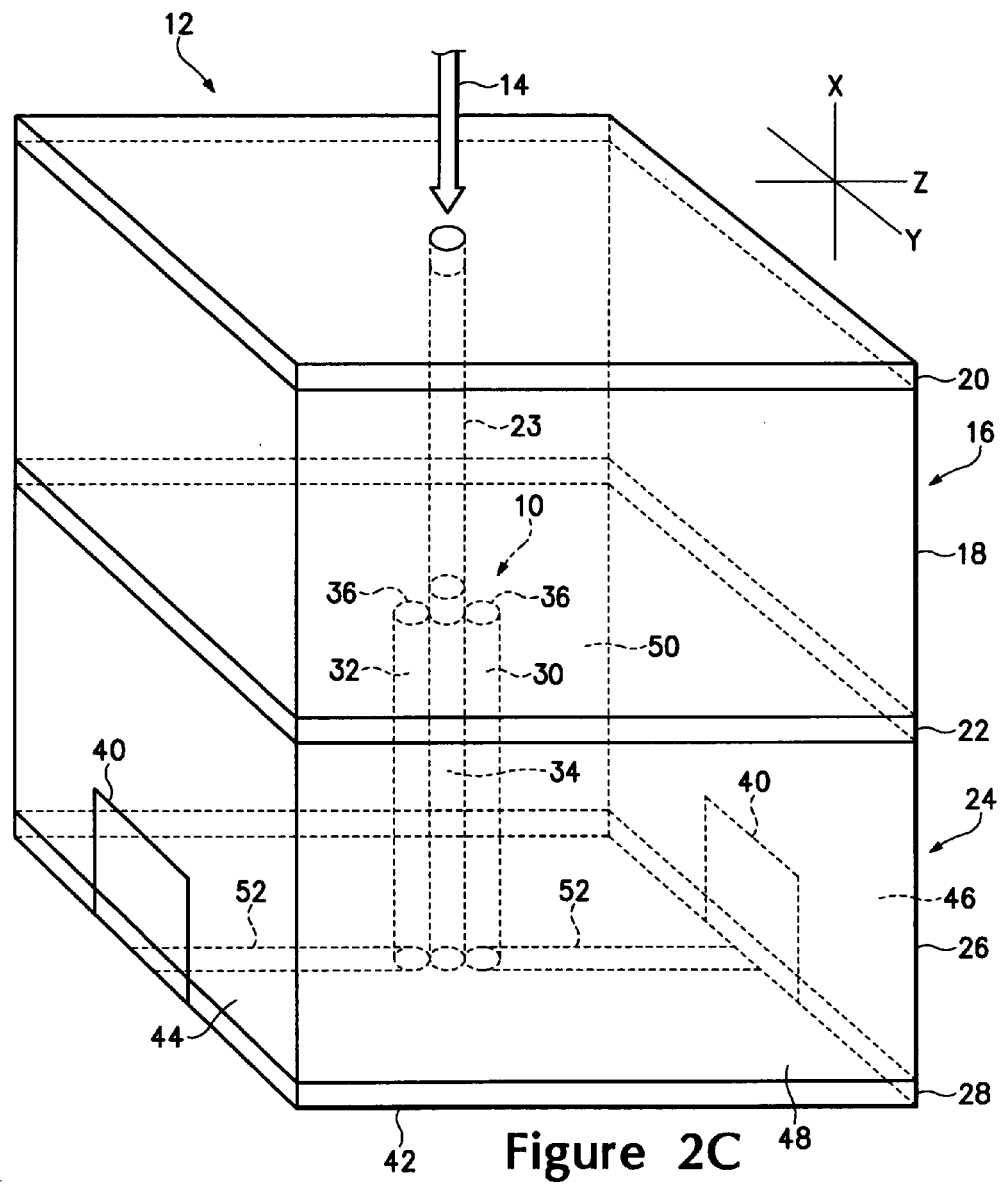
Figure 2D:
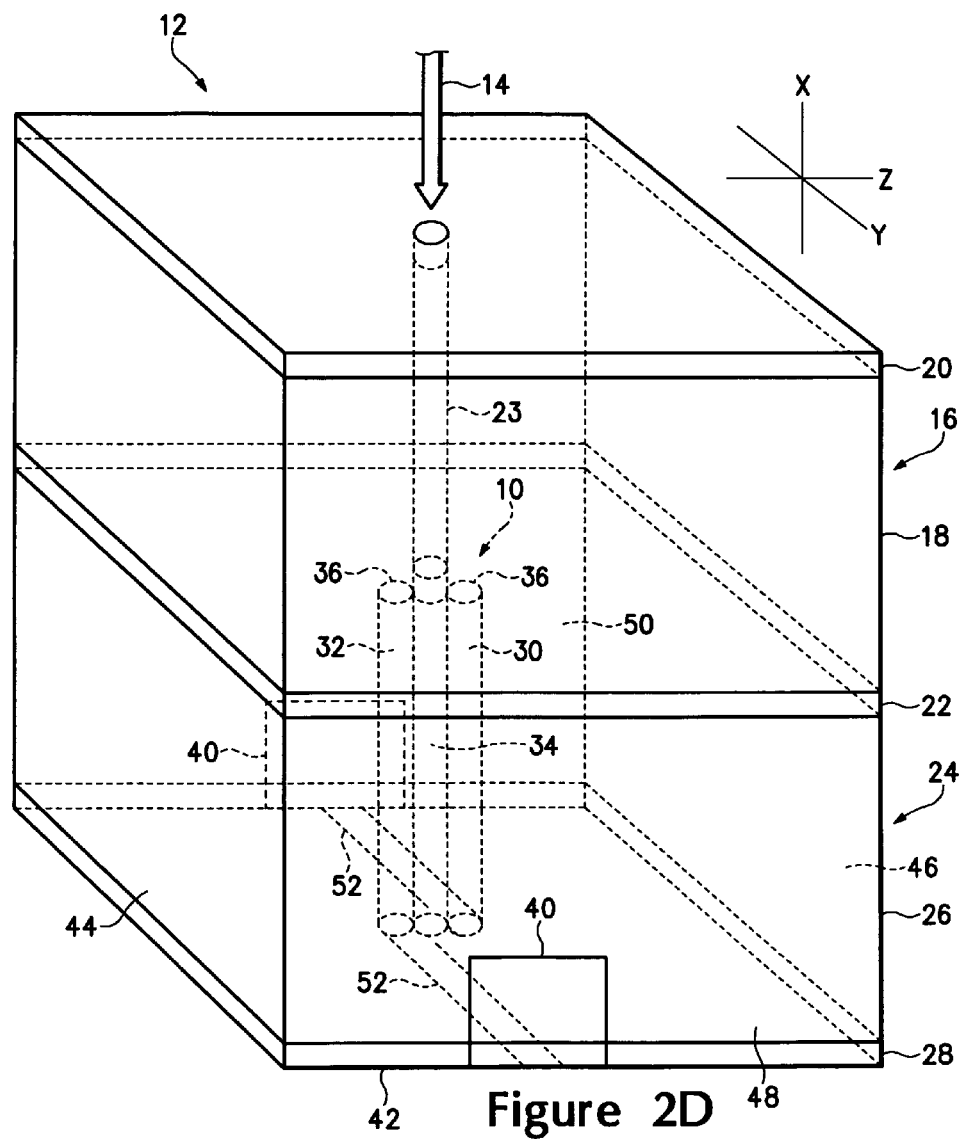
Figure 2E:
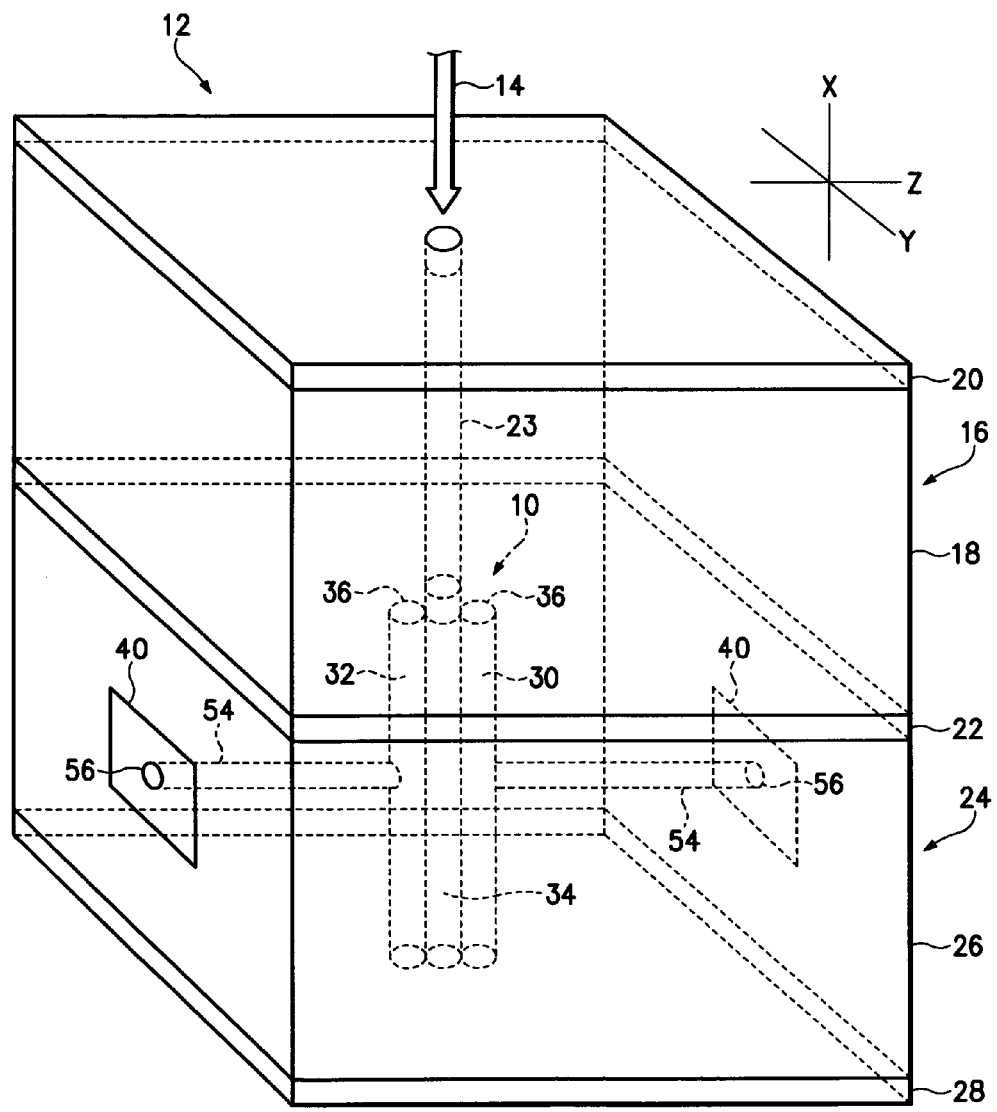

FIGS. 2A through 2E illustrates alternative electrically conductive contact 40 configurations in the electrode structure 10 of the present invention. The electrically conductive contacts 40 may be formed using well know deposition techniques, such as thin and thick film processes. The electrically conductive contacts 40 are preferably formed of gold deposited over a layer of chromium. In FIGS. 2A and 2B, the electrically conductive contacts 40 are formed on the same exterior surface 42 of the optically reflective material 28 with each contact 40 in electrical contact with the electrically conductive material 36 in one of the respective apertures 30 and 32. The electrically conductive contacts 40 are preferably a polygonal shape with an apex electrically coupled to the respective electrically conductive materials 36 in the apertures 30 and 32. In the preferred embodiment, the separation between the electrically conductive contacts 40 is in the range of 15 to 100 microns with the apertures 30 and 32 set slightly back from the apexes of the contacts 40. In FIGS. 2C and 2D, the electrically conductive contacts 40 are formed on opposing exterior surfaces 44, 46 and 48, 50 of the electro-optic material 26. Conductive traces 52 electrically couple the electrically conductive material 36 of the respective apertures 30 and 32 to the electrically conductive contacts 40 on the opposing surfaces 44, 46 and 48 and 50. While the figures illustrate the electrically conductive contacts 40 being on opposing surfaces of the electro-optic material 26, the electrically conductive contacts 40 may be formed on adjacent surfaces of the electro-optic material 26. As with the electrically conductive contacts 40 formed on the same surface, the apertures 30 and 32 intersect the conductive traces 52 with the separation between the conductive traces at the apertures 30 and 32 being in the range of 15 to 100 microns. FIG. 2E illustrates a further configuration for the electrically conductive contacts 40. Apertures 54 are formed in the electro-optic material 26 that intersect the respective electrode structure apertures 30 and 32. Electrically conductive contacts 40 are formed on the surface or surfaces of the electro-optic material 26 that intersect the apertures 54. Electrically conductive material 56 is disposed in the apertures 54 that electrically couples the electrically conductive contacts 40 to the electrically conductive material 36 in the apertures 30 and 32.

Figure 3A:
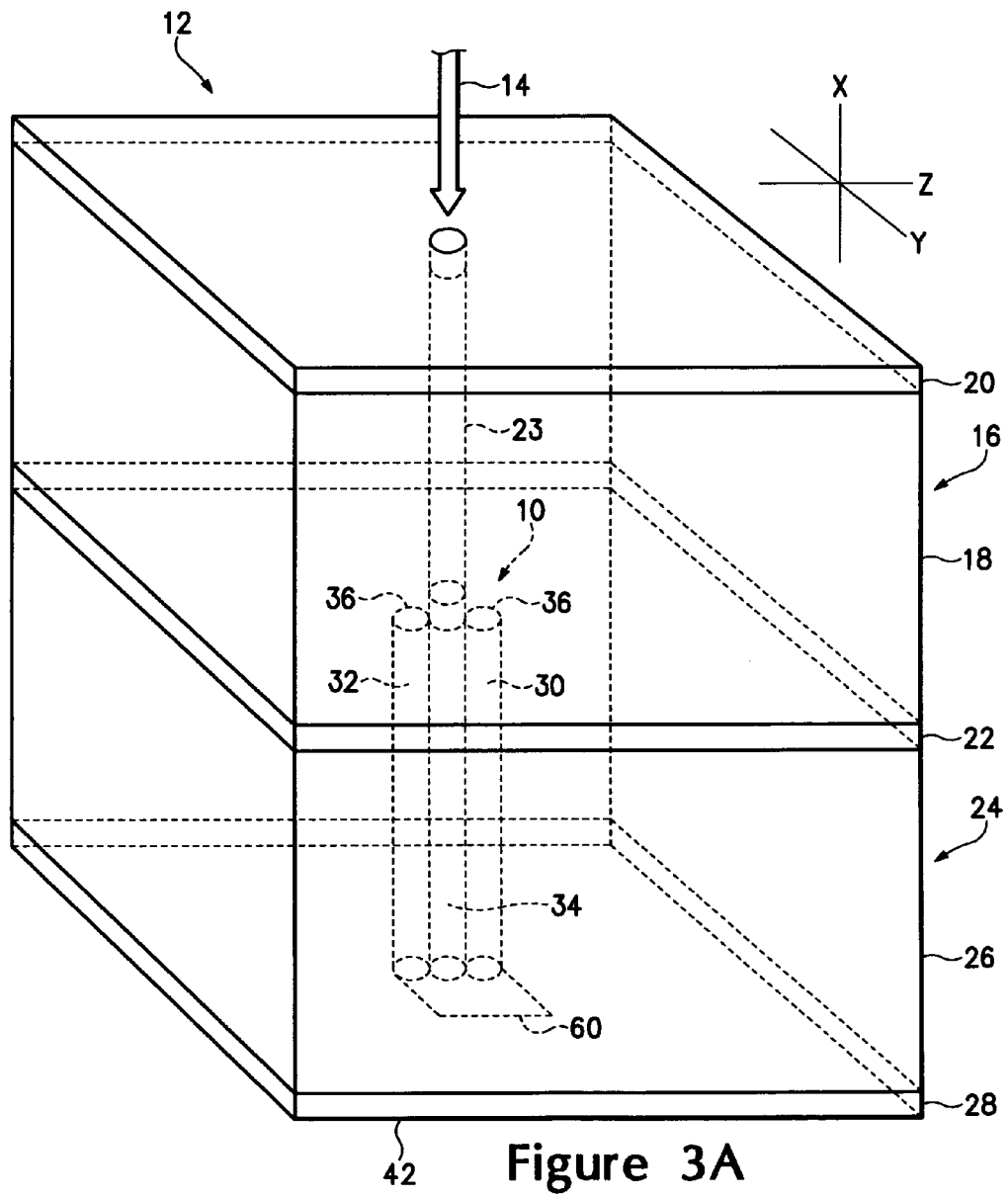
FIG. 3A-3B illustrate alternative embodiments of the micro-cavity laser according to the present invention.
Figure 3B:
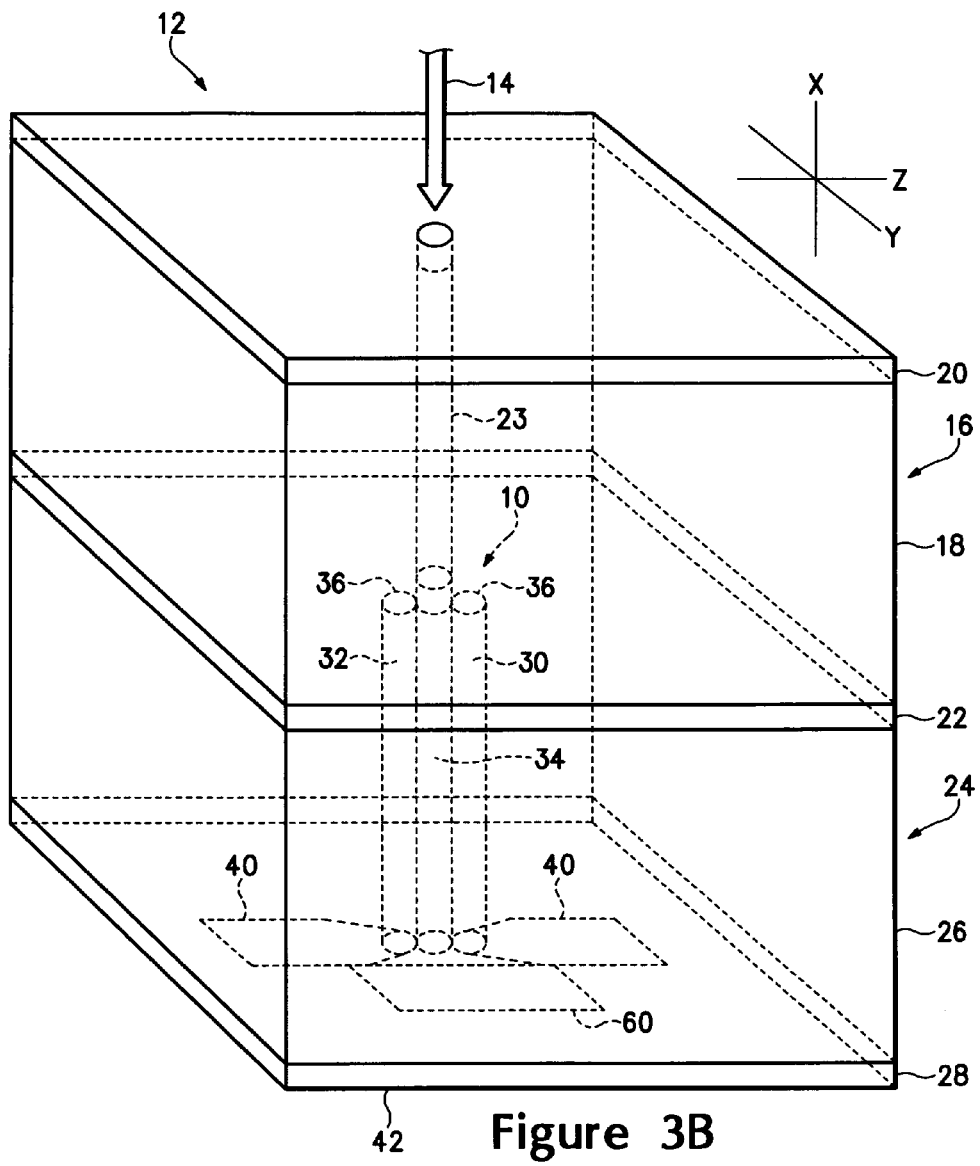

FIGS. 3A and 3B illustrate further embodiments of the micro-cavity laser 12 of the present invention. The electrode structure 10 described has an high input impedance. In certain applications it may be preferable to match the impedance of the electrode structure 10 to the impedance of the device providing the electro-magnetic energy to the electrode structure 10. In FIG. 3A, an optional termination resistor 60 is shown formed on exterior surface 42 of the micro-cavity laser 12 that is perpendicular to the apertures 30 and 32. The termination resistor 60 is connected between the electrically conductive materials 36 in the apertures 30 and 32 of the optical resonant cavity 24. The termination resistor 60 may be formed using well known processing techniques, such as thin or thick film processing. The resistance of the termination resistor 60 is set to match the impedance of the electrical device driving the optical resonant cavity 24. In FIG. 3B, the optional termination resistor 60 is shown connected between the electrically conductive contacts 40 on the exterior surface 42 of the optically reflective material 28. In the embodiments where conductive traces 52 couple the electrically conductive contacts 40 to the electrically conductive materials 36 in the apertures 30 and 32, the termination resistor 60 may be coupled to the conductive traces 52.

The micro-cavity laser 12 may also be formed as a monolithic device using a Vertical Cavity Surface Emitting Laser (VCSEL) as the gain cavity 16 and the optical resonant cavity 24 with the electro-optic material 26. The micro-cavity laser 12 of this design is processed using well known semiconductor lithography processes. The VCSEL has a thickness of approximately 1 micron with the optically reflective materials 20, 22 and 28 having thicknesses of approximately 5 microns. The electro-optic material 26 has a thickness of approximately 5 microns. The semiconductor lithography process is used to form the electrode structure 10 in the optical resonant cavity 24. The VCSEL gain cavity 16 is pumped with a coherent optical source to generate a laser output that is coupled to the optical resonant cavity 24. An electrical signal applied to the electrode structure 10 varies the index of refraction of the electro-optic material 26 resulting in the frequency modulation of the laser light generated by the VCSEL gain cavity 16.

An micro-cavity laser has been described having increased sensitivity. The micro-cavity laser has an electrode structure disposed within the optical resonant cavity having substantially parallel apertures filed with an electrically conductive material. The apertures are substantially parallel to an optical path of the laser signal generated by the gain cavity propagating through the optical resonant cavity. Electrically conductive contacts maybe disposed on the exterior surface of the micro-cavity laser and electrically coupled to the electrically conductive material within the apertures.

It will be obvious to those having skill in the art that many changes may be made to the details of the above-described embodiments of this invention without departing from the underlying principles thereof. The scope of the present invention should, therefore, be determined only by the following claims.

What is claimed is:

1. An optically pumped micro-cavity laser receiving an optical signal comprising:

an optical gain cavity having an optical gain medium disposed between opposing optically reflective materials receiving the optical signal and generating an optical output;

an optical resonant cavity having electro-optic material disposed between opposing optically reflective materials with one of the optically reflective materials being a common reflective material with one of the optical reflective materials of the optical gain cavity receiving the optical output from the optical gain cavity;

a conductive electrode structure having first and second apertures formed in the electro-optic material generally orthogonal to the optically reflective materials and generally parallel to the received optical output from the optical gain cavity propagating within the electro-optic material; and electrically conductive material disposed within the first and second apertures.

2. The optically pumped micro-cavity as recited in claim 1 further comprising a resistor coupled between the electrically conductive materials disposed within the first and second apertures.

3. The optically pumped micro-cavity as recited in claim 1 further comprising electrically conductive contacts formed on at least one exterior surface of the optical resonant cavity with one of the electrically conductive contacts electrically coupled to the electrically conductive material disposed in the first aperture and the other electrically conductive contact electrically coupled to the electrically conductive material disposed in the second aperture.

4. The optically pumped micro-cavity as recited in claim 3 further comprising a resistor coupled between the electrically conductive contacts.

5. The optically pumped micro-cavity as recited in claim 3 wherein each of the electrically conductive contacts is formed on a separate exterior surface of the optical resonant cavity.

6. The optically pumped micro-cavity as recited in claim 1 wherein the first and second apertures are disposed adjacent to the received optical output generated by the optical gain cavity and propagating within the electro-optic material.

7. The optically pumped micro-cavity as recited in claim 1 wherein optical gain cavity further comprises a Vertical Cavity Surface Emitting Laser.

* * * * *